(12) United States Patent
Trueba et al.

(10) Patent No.: US 11,735,156 B1
(45) Date of Patent: Aug. 22, 2023

(54) SYNTHETIC SPEECH PROCESSING

(71) Applicant: Amazon Technologies, Inc., Seattle, WA (US)

(72) Inventors: Jaime Lorenzo Trueba, Cambridge (GB); Alejandro Ricardo Mottini d'Oliveira, Seattle, WA (US); Thomas Renaud Drugman, Carnieres (BE); Sri Vishnu Kumar Karlapati, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 17/007,709

(22) Filed: Aug. 31, 2020

(51) Int. Cl.
*G10L 13/02* (2013.01)
*G10L 15/08* (2006.01)
*G06F 3/16* (2006.01)
*G06N 3/084* (2023.01)
*G10L 25/30* (2013.01)

(52) U.S. Cl.
CPC .......... *G10L 13/02* (2013.01); *G06F 3/16* (2013.01); *G06N 3/084* (2013.01); *G10L 15/08* (2013.01); *G10L 25/30* (2013.01); *G10L 2015/088* (2013.01)

(58) Field of Classification Search
CPC .......... G10L 13/00; G10L 15/00; G10L 19/00; G10L 25/00; G10L 15/26; G10L 15/02; G10L 15/20; G10L 15/187; G10L 13/08; G10L 15/18; G10L 2015/0631; G10L 19/16; G10L 25/60; G10L 25/75; H04M 2201/40; H04M 2250/74; H04M 2201/39; H04W 72/042; H04W 74/004; H04W 72/0413; H04B 7/06
See application file for complete search history.

(56) References Cited

U.S. PATENT DOCUMENTS

| | | | |
|---|---|---|---|
| 10,706,856 B1* | 7/2020 | Korjani | G10L 17/02 |
| 2002/0013708 A1* | 1/2002 | Walker et al. | H04M 1/72436 704/260 |

(Continued)

OTHER PUBLICATIONS

Brian McFee, Colin Raffel, Dawen Liang, Daniel PW Ellis, Matt McVicar, Eric Battenberg, and Oriol Nieto, "librosa: Audio and music signal analysis in python," in Proc. of the 14th python in science conference, 2015.

Hirokazu Kameoka, Takuhiro Kaneko, Kou Tanaka, and Nobukatsu Hojo, "Stargan-vc: Non-parallel many-tomany voice conversion using star generative adversarial networks," in 2018 IEEE Spoken Language Technology Workshop (SLT). IEEE, 2018, pp. 266-273.

ITU-R Recommendation, "Method for the subjective assessment of intermediate sound quality (MUSHRA)," ITU, BS, pp. 1543-1, 2001.

Jaime Lorenzo-Trueba, Junichi Yamagishi, Tomoki Toda, Daisuke Saito, Fernando Villavicencio, Tomi Kinnunen, and Zhenhua Ling, "The voice conversion challenge 2018: Promoting development of parallel and nonparallel methods," arXiv preprint arXiv:1804.04262, 2018.

Jaime Lorenzo-Trueba, Thomas Drugman, Javier Latorre, Thomas Merritt, Bartosz Putrycz, Roberto Barra-Chicote, Alexis Moinet, and Vatsal Aggarwal, "Towards achieving robust universal neural vocoding," Interspeech, 2019.

(Continued)

*Primary Examiner* — Linda Wong
(74) *Attorney, Agent, or Firm* — PIERCE ATWOOD LLP

(57) ABSTRACT

A speech-processing system receives first audio data correspond to a first voice and second audio data corresponding to a second voice. The speech-processing system determines vocal characteristics of the second voice and determines output corresponding to the first audio data and the vocal characteristics.

20 Claims, 13 Drawing Sheets

(56) References Cited

U.S. PATENT DOCUMENTS

| | | | |
|---|---|---|---|
| 2008/0015860 A1* | 1/2008 | Lane et al. | G10L 19/0018 704/258 |
| 2020/0074985 A1* | 3/2020 | Clark et al. | G10L 25/18 |
| 2020/0380952 A1* | 12/2020 | Zhang | G10L 13/047 |
| 2022/0405549 A1* | 12/2022 | Sim et al. | G10L 15/22 |

OTHER PUBLICATIONS

Joachim Thiemann, Nobutaka Ito, and Emmanuel Vincent, "The diverse environments multi-channel acoustic noise database (demand): A database of multichannel environmental noise recordings," in Proc. of Meetings on Acoustics, 2013, vol. 19.

Joan Serra, Santiago Pascual, and Carlos Segura Perales, "Blow: a single-scale hyperconditioned flow for nonparallel raw-audio voice conversion," in Advances in Neural Information Processing Systems, 2019.

Kaizhi Qian, Yang Zhang, Shiyu Chang, Xuesong Yang, and Mark Hasegawa-Johnson, "Autovc: Zero-shot voice style transfer with only autoencoder loss," in Proc. of the 36th International Conference on Machine Learning, 2019, vol. 97, pp. 5210-5219.

Li Wan, Quan Wang, Alan Papir, and Ignacio Lopez Moreno, "Generalized end-to-end loss for speaker verification," in International Conference on Acoustics, Speech and Signal Processing (ICASSP). IEEE, 2018.

Marco Jeub, Magnus Schafer, and Peter Vary, "A binaural room impulse response database for the evaluation of dereverberation algorithms," in 16th International Conference on Digital Signal Processing IEEE, 2009.

Michael McAuliffe, Michaela Socolof, Sarah Mihuc, Michael Wagner, and Morgan Sonderegger, "Montreal Forced Aligner: trainable text-speech alignment using Kaldi.," in Interspeech, 2017, pp. 498-502.

Pascal Vincent, Hugo Larochelle, Yoshua Bengio, and Pierre-Antoine Manzagol, "Extracting and composing robust Features with denoising autoencoders," in Proc. of the 25th international conference on Machine learning, 2008, pp. 1096-1103.

Robin Scheibler, Eric Bezzam, and Ivan Dokmanic, "Pyroomacoustics: A python package for audio room simulation and array processing algorithms," in International Conference on Acoustics, Speech and Signal Processing (ICASSP). IEEE, 2018, pp. 351-355.

Seyed Hamidreza Mohammadi and Alexander Kain, "An overview of voice conversion systems," Speech Communication, vol. 88, pp. 65-82, 2017.

Tomohiro Nakatani, Takuya Yoshioka, Keisuke Kinoshita, Masato Miyoshi, and Biing-Hwang Juang, "Speech dereverberation based on variance-normalized delayed linear prediction," IEEE Transactions on Audio, Speech, and Language Processing, vol. 18, no. 7, pp. 1717-1731, 2010.

Vassil Panayotov, Guoguo Chen, Daniel Povey, and Sanjeev Khudanpur, "Librispeech: an asr corpus based on public domain audio books," in International Conference on Acoustics, Speech and Signal Processing (ICASSP). IEEE, 2015, pp. 5206-5210.

Xiaokong Miao, Meng Sun, Xiongwei Zhang, and Yimin Wang, "Noise-robust voice conversion using high-quefrency boosting via sub-band cepstrum conversion and fusion," Applied Sciences, vol. 10, No. 1, 2020.

Yamagishi, Junichi; Veaux, Christophe; MacDonald, Kirsten. "CSTR VCTK corpus: English multi-speaker corpus for CSTR voice cloning toolkit," 2017.

Yannis Stylianou, Olivier Cappe, and Eric Moulines, "Continuous probabilistic transform for voice conversion," IEEE Transactions on speech and audio processing, vol. 6, No. 2, pp. 131-142, 1998.

Yariv Ephraim and David Malah, "Speech enhancement using a minimum mean-square error log-spectral amplitude estimator," IEEE transactions on acoustics, speech, and signal processing, vol. 33, No. 2, pp. 443-445, 1985.

Yuki Saito, Yusuke Ijima, Kyosuke Nishida, and Shinnosuke Takamichi, "Non-parallel voice conversion using variational autoencoders conditioned by phonetic posteriorgrams and d-vectors," in IEEE International Conference on Acoustics, Speech and Signal Processing (ICASSP), 2018, pp. 5274-5278.

* cited by examiner

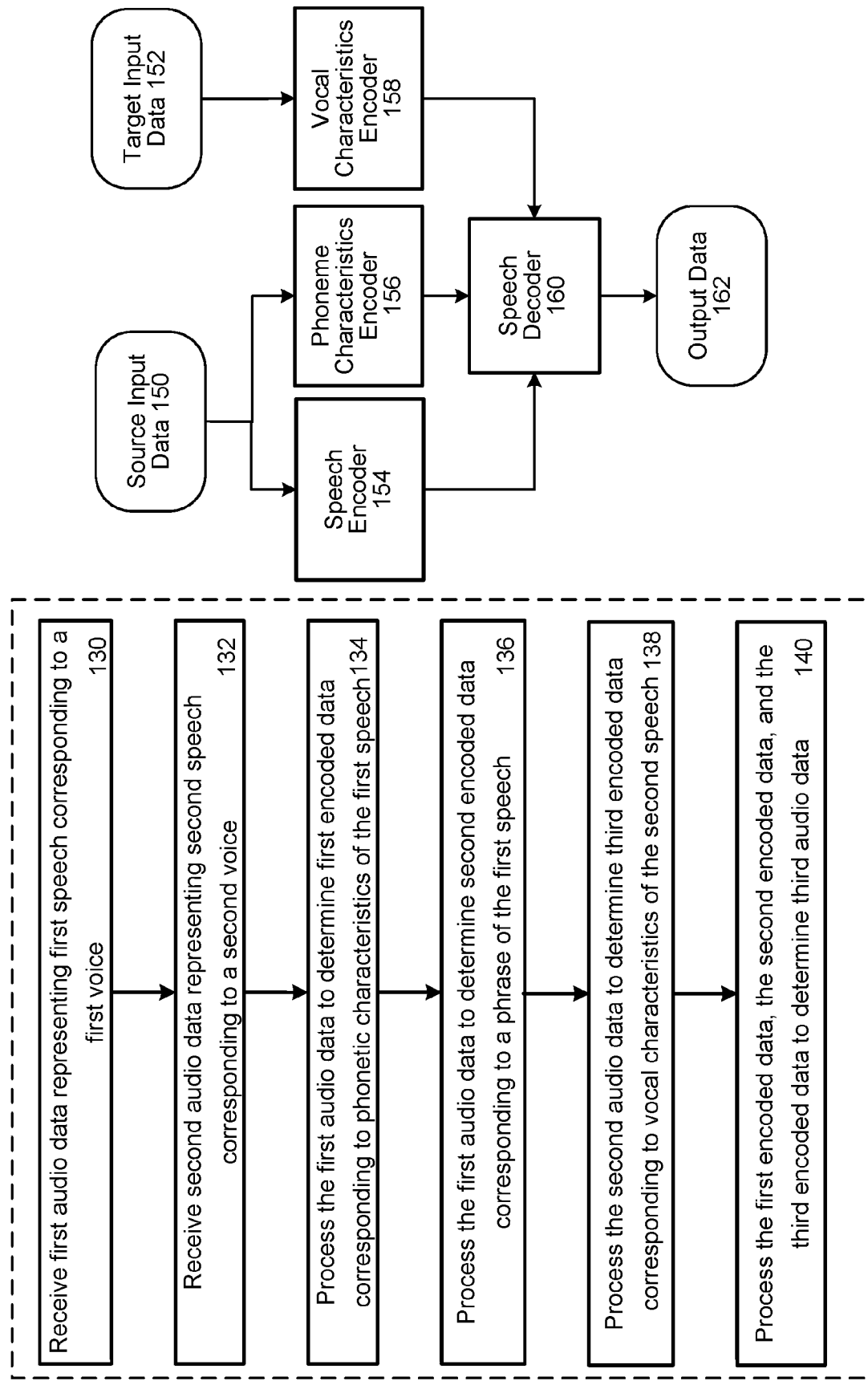

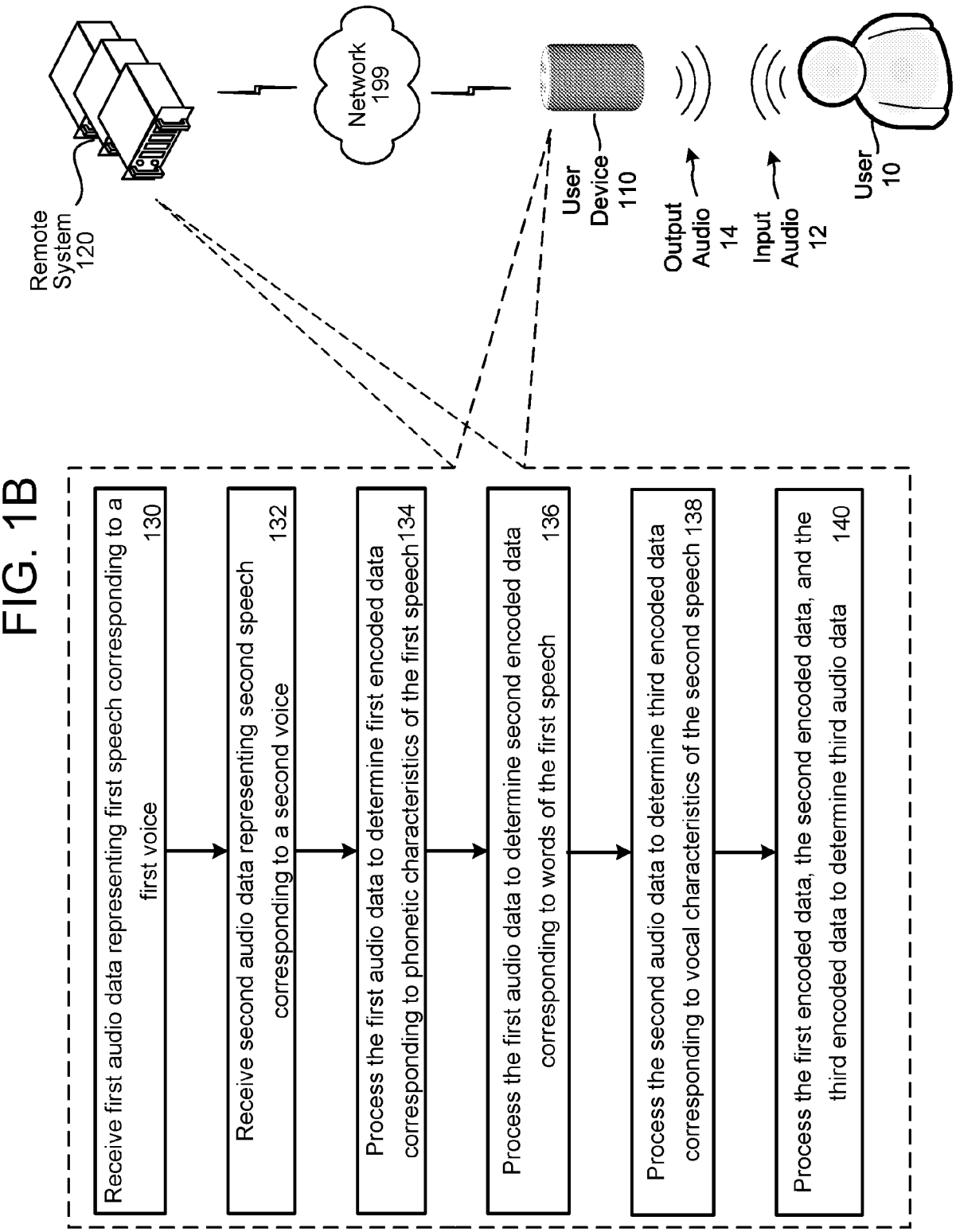

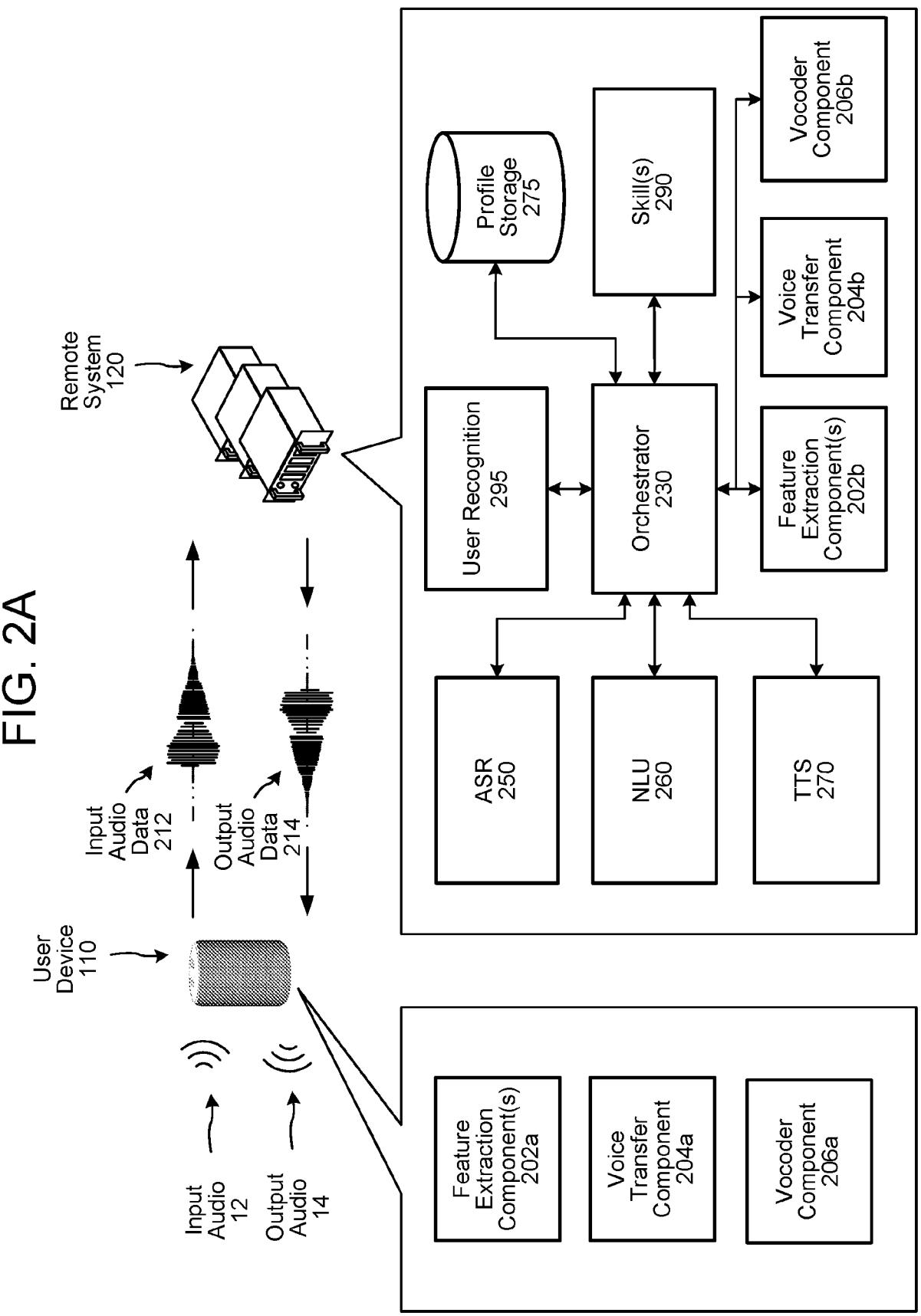

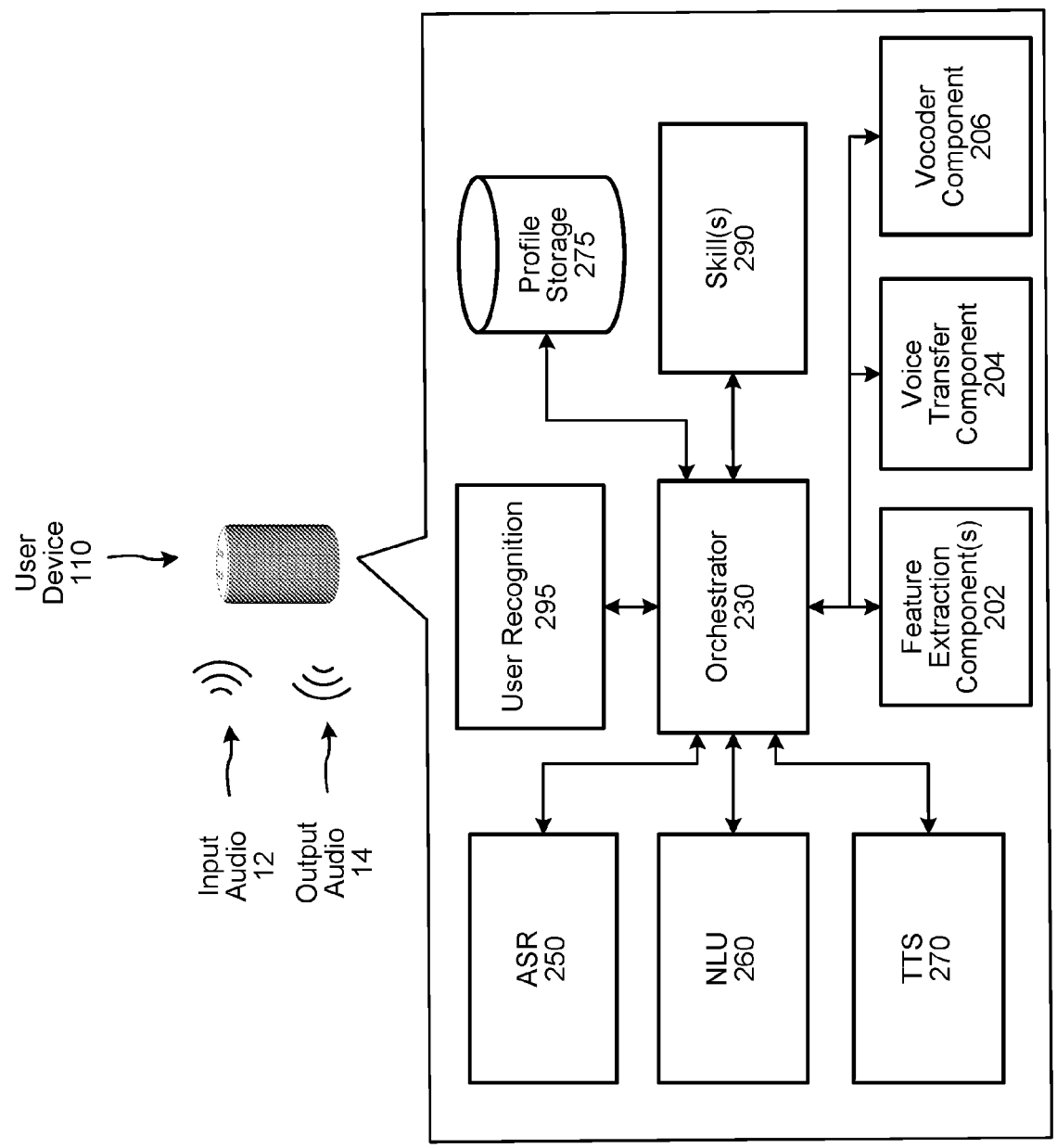

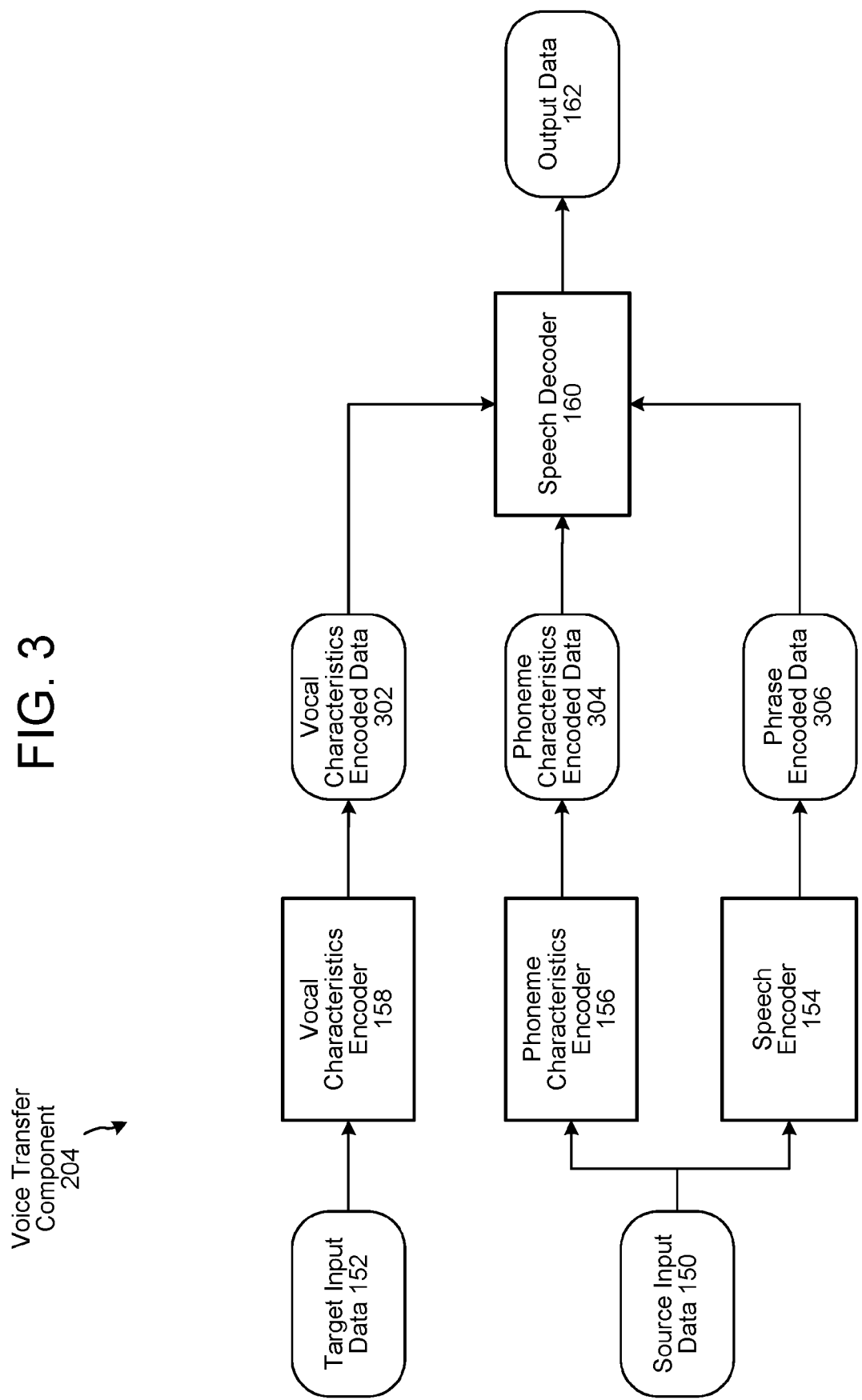

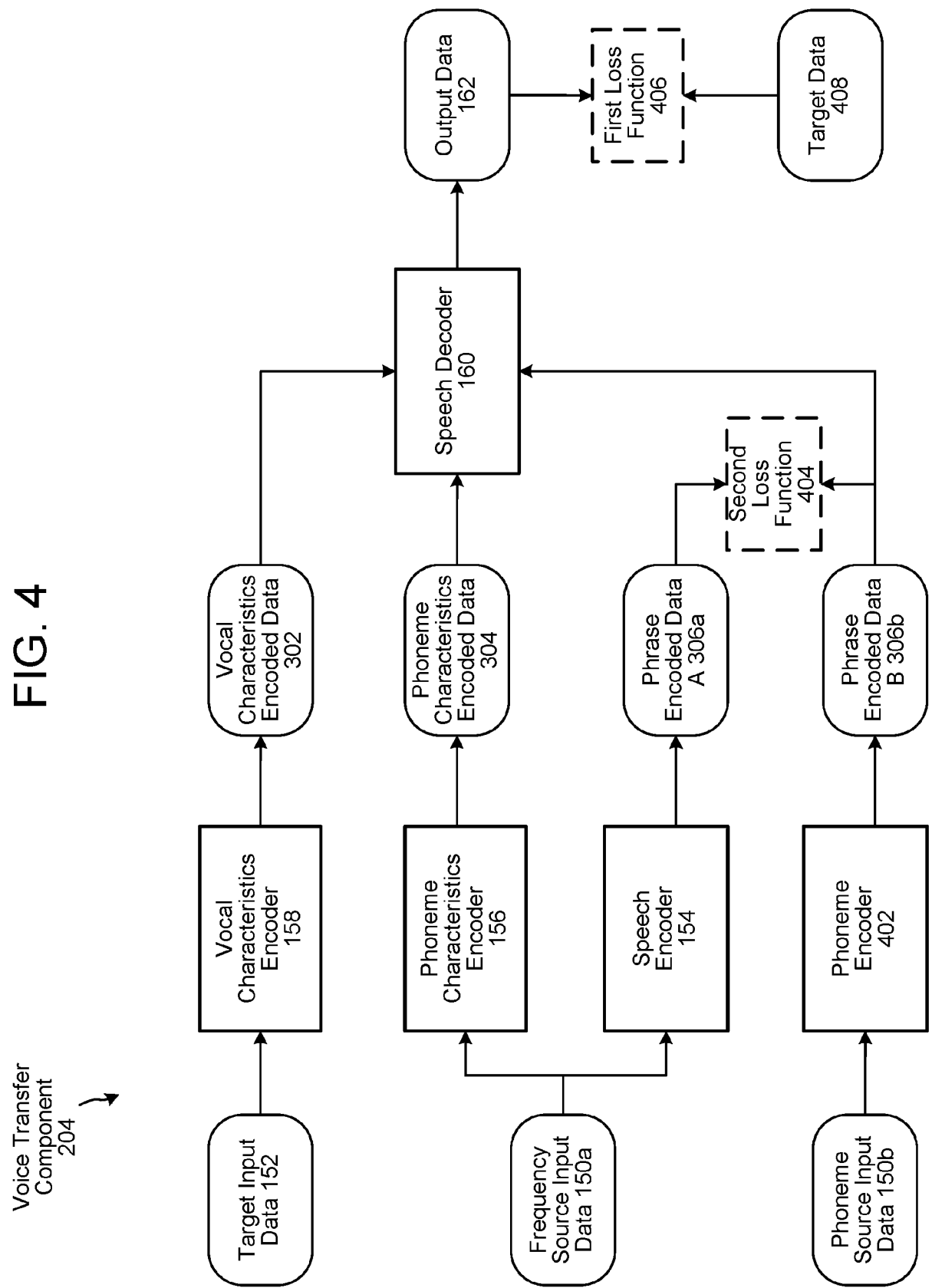

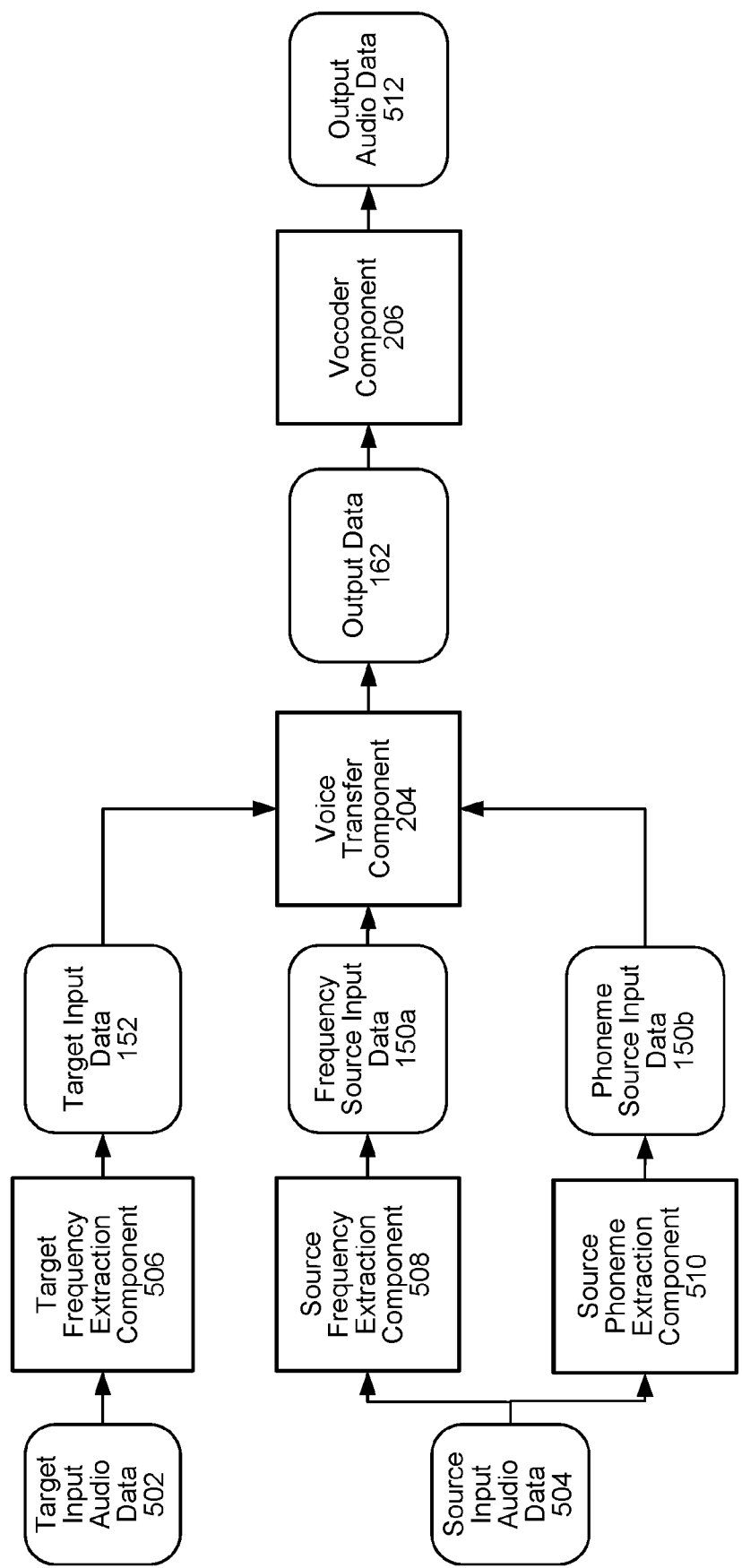

SYNTHETIC SPEECH PROCESSING

BACKGROUND

A speech-processing system may include a feature extractor that processes audio data to determine frequency data, such as spectrogram data, based on the audio data. One or more neural networks may process the frequency data to determine processed frequency data. A vocoder may then process the processed frequency data to determine output audio data that includes a representation of synthesized speech.

BRIEF DESCRIPTION OF DRAWINGS

For a more complete understanding of the present disclosure, reference is now made to the following description taken in conjunction with the accompanying drawings.

FIGS. 1A and 1B illustrate methods for speech processing according to embodiments of the present disclosure.

FIG. 2A illustrates components of a user device and of a remote system for speech processing according to embodiments of the present disclosure.

FIG. 2B illustrates components of a user device for speech processing according to embodiments of the present disclosure.

FIG. 3 illustrates components for generating output data given input data according to embodiments of the present disclosure.

FIG. 4 illustrates training component for generating output data given input data according to embodiments of the present disclosure.

FIG. 5 illustrates components for generating output audio data given input audio data according to embodiments of the present disclosure.

DETAILED DESCRIPTION

Figure 6A:
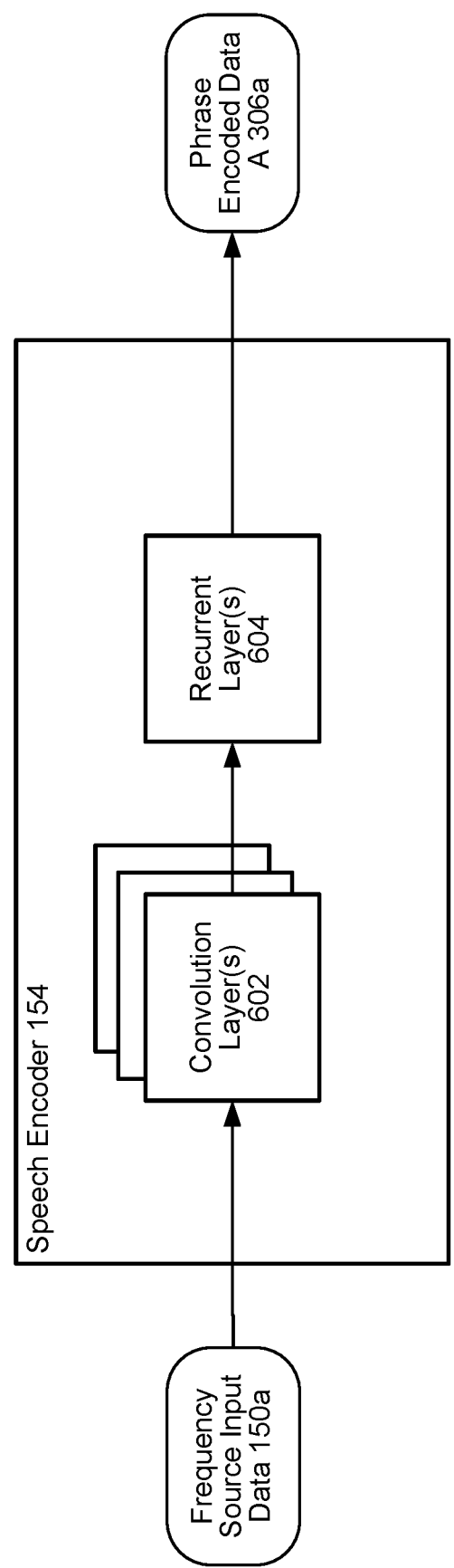
FIGS. 6A and 6B illustrate components of for processing audio data according to embodiments of the present disclosure.

Speech-processing systems may employ one or more of various techniques to generate synthesized speech from input data such as audio data and/or other data representing first speech. For example, a frequency extraction component may generate frequency data, such as Mel-spectrogram data, given the input data representing the first speech. One or more other components may process the frequency data to determine second frequency data. A vocoder, such as a neural-network model-based vocoder, may then process the second frequency data to determine output data that includes a representation of the synthesized speech based on the input data.

As explained in greater detail herein, in some embodiments, one or more of these other components may process the frequency data to remove vocal characteristics of a source voice and add vocal characteristics of a target voice while retaining other aspects of the frequency data, such as phoneme characteristics and phoneme data. A speech-processing system may thus process the input data to anonymize speech represented therein prior to causing further processing of the output data, such as speech-recognition processing and/or processing as part of audio and/or video communication.

The processing component(s), referred to herein as a voice-transfer component, may include one or more neural-network models configured as one or more encoders and one or more neural-network models configured as one or more decoders. A first encoder may process first input data corresponding to a source voice to determine first encoded data representing phoneme characteristics of the source voice, and a second encoder may process the first input data to determine second encoded data representing a phrase represented in the first input data. A third encoder may process second input data corresponding to a target voice to determine vocal characteristic data representing vocal characteristics of the target voice. A decoder may process the data output by the encoders to determine output data; this output data may correspond to the vocal characteristics of the target voice. As described herein, the first input data may include a representation of an utterance and a representation of noise. This noise may be, for example, other speech, environmental sounds, reverberations, and/or echoes. The decoder may be trained using training data to output a representation of the utterance but not the noise given input data that includes a representation of both the utterance and the noise.

In various embodiments, the speech-processing system is distributed across one or more user devices, such as a smartphone and/or other smart loudspeaker, and one or more remote systems, such as server(s). The user device may capture audio that includes speech and then process the audio data and/or transmit the audio data representing the audio to the remote system for further processing. The remote system may have access to greater computing resources, such as more and/or faster computer processors, than does the user device, and may thus be able to process the audio data and determine an appropriate response faster than the user device. The user device may have, for example, a wakeword-determination component that detects presence of a wakeword in audio and transmits audio data corresponding to the remote system only when the wakeword is detected. As used herein, a "wakeword" is one or more particular words, such as "Alexa," that a user of the user device may utter to cause the user device to begin processing the audio data, which may further include a representation of a command, such as "turn on the lights."

The remote system may include an automatic speech-recognition (ASR) component that processes the audio data to determine corresponding text data and a natural-language understanding (NLU) component that processes the text data to determine the intent of the user expressed in the text data and thereby determine an appropriate response to the intent. The remote system may then transmit data representing the response to the user device (or other device), which may then output the response. In other embodiments, a user of a user device may wish to transmit audio data for reasons other than ASR/NLU processing, such as one- or two-way audio communication with one or more other parties or remote systems.

In some embodiments, a user may wish to communicate with another person and/or system but may not want that person and/or system to determine the identity (or other personal information) of the user by hearing or processing the speech of the user. The user may, instead or in addition, wish to generate audio data from input text and/or audio data that has a particular set of vocal characteristics that may differ from those of the user. The present disclosure thus relates to processing audio data representing speech to replace audio characteristics of speech of the user (referred to herein as a "source voice") with audio characteristics of synthesized speech (referred to herein as a "target voice"). Some example uses cases for this technology, include security, privacy, gaming, and entertainment (e.g., creating content for podcasts, music, movies, etc.).

Referring to FIG. 1A, a voice-transfer component may receive source input data 150 and target input data 152. The source input data 150 may include a representation of an utterance corresponding to a source voice, and the target input data 152 may include a representation of an utterance corresponding to a target voice. A speech encoder 154 and/or a phoneme characteristics encoder 156 may process the source input data 150, and a vocal characteristics encoder 158 may process the target input data 152. A speech decoder 160 may process the outputs of the encoders 154, 156, 158 to determine output data 162. The encoders 154, 156, 158 and decoder 160 are described in greater detail herein, for example with reference to FIG. 3.

Referring also to FIG. 1B, in various embodiments, a remote system 120 (and/or other system) may verify the output of the ASR component to determine that the text data output thereby corresponds to the audio data. That is, the remote system 120 may determine whether the text data accurately transcribes one or more words represented in the audio data. The user device 110 and/or remote system 120 may determine that the audio data includes a representation of a wakeword and may determine the text data. The user device 110 and/or remote system 120 may then process the audio data and text data to determine this correspondence. The user device 110 and/or remote system 120 may send an indication of the correspondence to another system, such as the user device 110.

A user 10 may utter speech that is represented by input audio 12. A user device 110 may receive the input audio 12 and transduces it (using, e.g., a microphone) into corresponding audio data. As explained in further detail herein, the user device 110 may perform additional speech processing and/or may send the audio data to a remote system 120 for further audio processing via a network 199. Regardless of whether it is performed by the user device 110 and/or the remote system 120, an ASR component may process the audio data to determine corresponding text data, and an NLU component may process the text data to determine NLU data such as a domain, intent, and/or entity associated with the text data. The user device 110 and/or other device may output audio 14 corresponding to the output data 162.

In various embodiments, the user device 110 and/or remote system 120 receives (130) first audio data representing first speech corresponding to a first voice. This first voice may be referred to herein as the source voice. The first audio data may correspond to representations of phonemes, which may be representations of individual sounds representing the first speech. The first audio data may further correspond to phoneme characteristics and vocal characteristics; the phoneme characteristics may represent pronunciation of the first speech that is independent of a voice of a particular speaker, such as syllable breaks, cadence, and/or emphasis, while the vocal characteristics may represent features of the voice of a particular speaker, such as tone, resonance, timbre, pitch, and/or frequency. First audio data that represents first speech of a first speaker and second audio data that represents second speech of the same first speaker may thus correspond to the same or similar vocal characteristics but different phoneme characteristics. Third audio data that represents third speech of the first speaker and fourth audio data that represents the same third speech of a second speaker may thus correspond to the same or similar phoneme characteristics but different vocal characteristics. In other words, the same or similar vocal characteristics may correspond to audio data of a first speaker no matter what particular speech is represented in the audio data, while the same or similar phoneme characteristics may correspond to audio data of different speakers if those speakers utter the same words in a similar fashion. As described herein, the first audio data may be time-domain audio data and/or frequency-domain audio data, such as Mel-spectrogram data.

The user device 110 and/or remote system 120 may further receive (132) second audio data representing second speech corresponding to a second voice. Like the first audio data, the second audio data may be time-domain audio data and/or frequency-domain audio data, such as Mel-spectrogram data. The second audio data may similarly correspond to phonemes, phoneme characteristics, and/or vocal characteristics. Each of the first and/or second audio data may be received from a microphone of the user device 110 and/or other device and/or received from another source, such as computer storage.

The user device 110 and/or remote system 120 processes (134) the first audio data to determine first encoded data corresponding to phoneme characteristics of the first speech. For example, a first encoder such as the phoneme characteristics encoder 156 may process the source input data 150 to determine phoneme characteristics encoded data. As described herein, the phoneme characteristics encoder 156 may be or include a neural network, and the phoneme characteristics encoded data may be an N-dimensional vector of values representing phoneme characteristics of the source input data 150.

The user device 110 and/or remote system 120 may also process (136) the first audio data to determine second encoded data corresponding to a phrase corresponding to the first speech. For example, a second encoder such as the speech encoder 154 may process the source input data 150 to determine phrase encoded data. The phrase encoded data may be a vector representing one or more phonemes comprising a phrase represented in the first speech. As the term is used herein, "phrase" corresponds to one or more words (and/or non-speech sounds) of an utterance.

The user device 110 and/or remote system 120 processes (138) the second audio data (e.g., the target input data 152) to determine third encoded data corresponding to vocal characteristics of the second speech (e.g., the target speech). For example, a third encoder such as the vocal characteristics encoder 158 may process the target input data 152 to determine vocal characteristics encoded data. As described herein, the vocal characteristics encoded data may represent vocal characteristics of the target speech, such as tone, pitch, and/or frequency of the target speech, but not necessarily represent phonemes and/or phoneme characteristic data of the target speech.

The user device 110 and/or remote system 120 may then process (140) the first encoded data, the second encoded data, and the third encoded data to determine third audio data (e.g., the output data 162) that corresponds to the phrase encoded data, the phoneme characteristics encoded data, and the vocal characteristics encoded data. The output data 162 thus may include a representation of the phrase and/or phoneme characteristics corresponding to the source input data 150, while the representation further corresponds to the vocal characteristics represented in the target input data 152. The output data 162 may be frequency data, such as Mel-spectrogram data, and may be further processed by one or more other components, such as a vocoder, to determine time-domain audio data.

Referring to FIGS. 2A and 2B, a voice-transfer component 204, which may include the speech encoder 154, the phoneme characteristics encoder 156, the vocal characteristics encoder 158, and/or speech decoder 160 described herein, may be disposed on a user device 110 (such as the voice-transfer component 204a) and/or on a remote system 120 (such as the voice-transfer component 204b). Similarly, one or more feature extraction components 202 (such as, for example, the source frequency extraction component 508 shown in FIG. 5) may be disposed on the user device 110 (such as the feature extraction component 202a) and/or on a remote system 120 (such as the feature-extraction component 202b). A vocoder component 206 may similarly be disposed on the user device 110 (such as the vocoder component 206a) and/or on the remote system 120 (such as the vocoder component 206b). One or more other components of the speech-processing system may be disposed on the user device 110 and/or remote system 120.

Referring to FIG. 2A, for example, the user device 110 may capture audio that includes speech and then either process the audio itself and/or transmit audio data representing the audio to the remote system 120 for further processing. The remote system 120 may have access to greater computing resources, such as more and/or faster computer processors, than does the user device, and may thus be able to process the audio data and determine corresponding output data faster than the user device. The user device 110 may have, in addition to the voice-transfer component 204, a wakeword-determination component that detects presence of a wakeword in audio and transmits corresponding audio data to the remote system only when (or after) the wakeword is detected. As used herein, a "wakeword" is one or more particular words, such as "Alexa," that a user of the user device may utter to cause the user device to begin processing the audio data, which may further include a representation of a command, such as "turn on the lights."

Referring also to FIG. 2B, the speech-processing system, including the voice-transfer component 204, may disposed wholly on the user device 110. In other embodiments, some additional components, such as an ASR component, are disposed on the user device 110, while other components are disposed on the remote system 120. Any distribution of the components of the speech-processing system of the present disclosure is, thus, within the scope of the present disclosure. The discussion herein thus pertains to both the distribution of components of FIGS. 2A and 2B and also to similar distributions.

The user device 110 may receive the input audio 12 (which may be the source audio and/or target audio) and, using an audio capture component such as a microphone or array of microphones, determine corresponding audio data that may include a representation of an utterance of the user 10 and/or other user. The user device 110 may first, using the feature extraction component 202, extract frequency data (e.g., Mel-spectrogram data), phoneme data, and/or other data, from the input audio. The frequency data may be a number of floating-point digits that specify the amplitudes of frequencies reflected in a duration of audio data. The phoneme data may be a sequence of representation of speech sounds represented in the audio data. The user device 110 may then, using the voice-transfer component 204, transfer vocal characteristics in the extracted feature data from a source voice to a target voice. The user device 110 may then process the output of the voice-transfer component 204 with a vocoder component 206 to generate the output audio data 214. Each of the feature-extraction component 202, voice-transfer component 204 and the vocoder component 206 are described in greater detail herein.

The user device 110 and/or remote system 120 may further include an automatic speech-recognition (ASR) component that processes the audio data to determine corresponding text data and a natural-language understanding (NLU) component that processes the text data to determine the intent of the user expressed in the text data and thereby determine an appropriate response to the intent. The remote system 120 may determine and transmit data representing the response to the user device 110 (or other device), which may then output the response. In other embodiments, a user of the user device 110 may wish to transmit audio data for reasons other than ASR/NLU processing, such as one- or two-way audio communication with one or more other parties or remote systems.

Before processing the audio data, the device 110 may use various techniques to first determine whether the audio data includes a representation of an utterance of the user 10. For example, the user device 110 may use a voice-activity detection (VAD) component to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands and/or other quantitative aspects. In other examples, the VAD component may be a trained classifier configured to distinguish speech from background noise. The classifier may be a linear classifier, support vector machine, and/or decision tree. In still other examples, hidden Markov model (HMM) and/or Gaussian mixture model (GMM) techniques may be applied to compare the audio data to one or more acoustic models in speech storage; the acoustic models may include models corresponding to speech, noise (e.g., environmental noise and/or background noise), and/or silence.

If the VAD component is being used and it determines the audio data includes speech, the wakeword-detection component may only then activate to process the audio data to determine if a wakeword is likely represented therein. In other embodiments, the wakeword-detection component may continually process the audio data (in, e.g., a system that does not include a VAD component.) The user device 110 may further include an ASR component for determining text data corresponding to speech represented in the input audio 12 and may send this text data to the remote system 120.

The trained model(s) of the VAD component and/or wakeword-detection component may be CNNs, RNNs, acoustic models, hidden Markov models (HMMs), and/or classifiers. These trained models may apply general large-vocabulary continuous speech recognition (LVCSR) systems to decode the audio signals, with wakeword searching conducted in the resulting lattices and/or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN) / recursive neural network (RNN) structures directly, without using a HMM. The wakeword-detection component may estimate the posteriors of wakewords with context information, either by stacking frames within a context window for a DNN, or using a RNN. Follow-on posterior threshold tuning and/or smoothing may be applied for decision making. Other techniques for wakeword detection may also be used.

The remote system 120 may be used for additional audio processing after the user device 110 detects the wakeword and/or speech, potentially begins processing the audio data with ASR and/or NLU, and/or sends corresponding audio data 212. The remote system 120 may, in some circumstances, receive the audio data 212 from the user device 110 (and/or other devices or systems) and perform speech processing thereon. Each of the components illustrated in FIG. 2A may thus be disposed on either the user device 110 or the remote system 120. The remote system 120 may be disposed in a location different from that of the user device 110 (e.g., a cloud server) and/or may be disposed in the same location as the user device 110 (e.g., a local hub server).

The audio data 212 may be sent to, for example, an orchestrator component 230 of the remote system 120. The orchestrator component 230 may include memory and logic that enables the orchestrator component 230 to transmit various pieces and forms of data to various components of the system 120. An ASR component 250, for example, may first transcribe the audio data into text data representing one more hypotheses corresponding to speech represented in the audio data 212. The ASR component 250 may transcribe the utterance in the audio data based on a similarity between the utterance and pre-established language models. For example, the ASR component 250 may compare the audio data with models for sounds (which may include, e.g., subword units, such as phonemes) and sequences of sounds represented in the audio data to identify words that match the sequence of sounds spoken in the utterance. These models may include, for example, one or more finite state transducers (FSTs). An FST may include a number of nodes connected by paths. The ASR component 250 may select a first node of the FST based on a similarity between it and a first subword unit of the audio data. The ASR component 250 may thereafter transition to second and subsequent nodes of the FST based on a similarity between subsequent subword units and based on a likelihood that a second subword unit follows a first.

After determining the text data, the ASR component 250 may send (either directly and/or via the orchestrator component 230) the text data to a corresponding NLU component 260. The text data output by the ASR component 250 may include a top-scoring hypothesis and/or may include an N-best list including multiple hypotheses (e.g., a list of ranked possible interpretations of text data that represents the audio data). The N-best list may additionally include a score associated with each hypothesis represented therein. Each score may indicate a confidence of ASR processing performed to generate the hypothesis with which it is associated.

The NLU component 260 may process the text data to determine a semantic interpretation of the words represented in the text data. That is, the NLU component 260 determines one or more meanings associated with the words represented in the text data based on individual words represented in the text data. The meanings may include a domain, an intent, and one or more entities. As those terms are used herein, a domain represents a general category associated with the command, such as "music" or "weather." An intent represents a type of the command, such as "play a song" or "tell me the forecast for tomorrow." An entity represents a specific person, place, or thing associated with the command, such as "Toto" or "Boston." The present disclosure is not, however, limited to only these categories associated with the meanings (referred to generally herein as "natural-understanding data," which may include data determined by the NLU component 260 and/or the dialog manager component.)

The NLU component 260 may determine an intent (e.g., an action that the user desires the user device 110 and/or remote system 120 to perform) represented by the text data and/or pertinent pieces of information in the text data that allow a device (e.g., the device 110, the system 120, etc.) to execute the intent. For example, if the text data corresponds to "play Africa by Toto," the NLU component 260 may determine that a user intended the system to output the song Africa performed by the band Toto, which the NLU component 260 determines is represented by a "play music" intent. The NLU component 260 may further process the speaker identifier 214 to determine the intent and/or output. For example, if the text data corresponds to "play my favorite Toto song," and if the identifier corresponds to "Speaker A," the NLU component may determine that the favorite Toto song of Speaker A is "Africa."

The user device 110 and/or remote system 120 may include one or more skills 290. A skill 290 may be software such as an application. That is, the skill 290 may enable the user device 110 and/or remote system 120 to execute specific functionality in order to provide data and/or produce some other output requested by the user 10. The user device 110 and/or remote system 120 may be configured with more than one skill 290. For example, a weather skill 290 may enable the user device 110 and/or remote system 120 to provide weather information, a ride-sharing skill may enable the user device 110 and/or remote system 120 to book a trip with respect to a taxi and/or ride sharing service, and a food-order skill may enable the user device 110 and/or remote system 120 to order a pizza with respect to a restaurant's online ordering system. In some instances, the skill 290 may provide output text data responsive to received NLU results data.

In some instances, a speechlet 290 may provide output text data responsive to received NLU results data. The device 110 and/or system 120 may include a synthetic speech processing component 270 that generates output audio data from input text data and/or input audio data. The synthetic speech processing component 270 may use one of a variety of speech-synthesis techniques. In one method of synthesis called unit selection, the synthetic speech processing component 270 analyzes text data against a database of recorded speech. The synthetic speech processing component 270 selects units of recorded speech matching the text data and concatenates the units together to form output audio data. In another method of synthesis called parametric synthesis, the synthetic speech processing component 270 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input text data.

The user device 110 and/or remote system 120 may include a speaker-recognition component 295. The speaker-recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data 212 to stored audio characteristics of other synthesized speech. Output of the speaker-recognition component 295 may be used to inform NLU processing as well as processing performed by the speechlet 290.

The user device 110 and/or remote system 120 may include a profile storage 275. The profile storage 275 may include a variety of information related to individual users and/or groups of users who interact with the device 110. The profile storage 275 may similarly include information related to individual speakers and/or groups of speakers that are not necessarily associated with a user account.

Each profile may be associated with a different user and/or speaker. A profile may be specific to one user or speaker and/or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile and/or may be encompassed under another user profile. As illustrated, the profile storage 275 is implemented as part of the remote system 120. The profile storage 275 may, however, be disposed on the user device 110 and/or in a different system in communication with the user device 110 and/or system 120, for example over the network 199. The profile data may be used to inform NLU processing, dialog manager processing, and/or speech processing.

A user profile of the profile storage may indicate one or more privacy settings of a user of the user device 110. As described herein, some or all of the speech processing may be performed by the remote system 120; the user device 110 may, for example, determine the audio data using the one or more microphones and transmit the audio data to the remote system 120 for further processing. In some embodiments, however, the user profile may indicate that the audio data received from the microphone not be transmitted to the remote system 120. For example, the user 10 may wish to have only the output of the voice-transfer component 204 transmitted to the remote system and may include an indication of this transmission in the user profile. The voice-transfer component 204a of the user device 110 may then process the audio data received from the microphone and transmit the output data 162 to the remote system 120. The user device may thereafter delete the audio data.

Each profile may include information indicating various devices, output capabilities of each of the various devices, and/or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

FIG. 3 illustrates components of the voice-transfer component 204 for generating output data given input data according to embodiments of the present disclosure. The voice-transfer component 204 may include three encoders: a first, phoneme-characteristics encoder 156 configured to process the source input data 150 and determine phoneme characteristics encoded data 304; a second, speech encoder 154 to process the source input data 150 and determine phrase encoded data 306; and a third, vocal-characteristics encoder 158 configured to process the target input data 152 and determine vocal characteristics encoded data 302. The voice-transfer component 204 may further include a speech decoder 160 configured to process the vocal characteristics encoded data 302, the phoneme characteristics encoded data 304, and the phrase encoded data 306 to determine the output data 162. Each of these components and their output data are described in greater detail below.

The source input data 150 may be or include frequency data representing speech. This frequency data may be in the form of a spectrogram, such as a Mel-spectrogram and/or Mel-cestrum. The frequency data may be determined by processing time-domain audio data, such as audio data determined by a microphone. In various embodiments, the time-domain audio data is organized into groups of samples of audio data called "frames" of audio data. A frame of audio data may include, for example, 128 samples of audio data and correspond to 10 milliseconds of audio data. A group of frames, such as 256 frames, may be processed using, for example, a Fourier transform to transform the audio from time-domain audio data to frequency-domain audio data. The audio data may further be processed to transform the audio data into a Mel-frequency domain. A first item of frequency data may correspond to a first set of frames of audio data, while a second item of audio data may correspond to a second set of frames of audio data; some frames may be common to the first set. The first item of frequency data may, for example, correspond to frames 0-127, a second item of frequency data may correspond to frames 1-128, and so on.

The first, phoneme characteristics encoder 156 may process the source input data 150 to determine the phoneme characteristics encoded data 304. The phoneme characteristics encoder 156 may include one or more neural-network layers, such as DNN, CNN, and/or RNN layers. The phoneme characteristics encoded data 304 may be a vector of dimension N that represents phoneme characteristics of the speech represented in the source input data 150. The phoneme characteristics may include data representing the pronunciation of words and/or phrases represented in the source input data 150, such as syllable breaks, emphasis, vowel sounds, and/or consonant sounds. The phoneme characteristics encoded data 304 may not, however, include data specific to the vocal characteristics of the speech represented in the source input data 150, such as tone, pitch, and/or frequency. In other words, the phoneme characteristics encoder 156 may determine the same or similar phoneme characteristics encoded data 304 for source input data 150 that includes a representation of two or more speakers speaking the same utterance in the same way.

The second, speech encoder 154 may process the source input data 150 to determine phrase encoded data 306. The speech encoder 154 may similarly include one or more neural-network layers, such as DNN, CNN, and/or RNN layers. The phrase encoded data 306 may be a vector of dimension N that represents a phrase corresponding to the source input data 150. That is, a first phrase represented in the source input data corresponds to a first N-dimensional vector of values of the phrase encoded data 306, a second phrase represented in the source input data corresponds to a second N-dimensional vector of different values of the phrase encoded data, and so on.

The third, vocal characteristics encoder 156 may process the target input data 152 to determine vocal characteristics encoded data 302. The vocal characteristics encoder 158 may similarly include one or more neural-network layers, such as DNN, CNN, and/or RNN layers. The vocal characteristics encoded data 302 may be an N-dimensional vector of values that represents vocal characteristics of speech represented in the target input data 152. The vocal characteristics may be or include tone, pitch, and/or frequency of the speech. In other words, the vocal characteristics encoder 158 may determine the same or similar vocal characteristics encoded data 302 for target input data 152 that includes representations of the same speaker speaking different utterances.

The target input data 152 may be determined from audio data received from a microphone. In other embodiments, the target input audio data 152 may be determined from other sources, such as an audio and/or video recording of an utterance. Once determined, the vocal characteristics encoded data 302 may be stored in, for example, a computer storage device, and may be used during processing of additional source input data 150. In these embodiments, the voice-transfer component 204 may not include the vocal characteristics encoder 158 but may instead receive the vocal characteristics encoded data 302 from the computer storage device.

The speech decoder 160 may process the vocal characteristics encoded data 302, the phoneme characteristics encoded data 304, and the phrase encoded data 306 to determine the output data 162. The speech decoder 160 may similarly include one or more neural-network layers, such as DNN, CNN, and/or RNN layers. The speech decoder 160 may process the phrase encoded data 306 to determine output data 162 that includes a representation of the utterance represented in the source input data 150, may process the phoneme characteristics encoded data 304 to determine output data 162 that includes phoneme characteristics (e.g., pronunciation) represented in the source input data 150, and may process the vocal characteristics encoded data 302 to determine output data 162 that includes vocal characteristics represented in the target input data 152. The utterance represented in the output data 162 may thus corresponds to the utterance of the source input data 150 and the vocal characteristics of the target input data 152.

FIG. 4 illustrates components for training the voice-transfer component 204 and includes the first, phoneme-characteristics encoder 156, the second, speech encoder 154, the third, vocal-characteristics encoder 158, and the speech decoder 160. FIG. 4 also includes a phoneme encoder 402 configured to process phoneme source input data 150b to determine phase encoded data B 306b. The phoneme source input data 150b may include representations of a sequence of phonemes represented in the utterance of the source input data 150. As the term is used herein, a phoneme is a syllable-level or sub-syllable level representation of a sound that makes up a particular word. The word "Alexa," for example, may include three syllables: "a," "lex," and "a." The second syllable, "lex," however, may comprise two phonemes: <LE> and <EKS>. Other words may be comprised of other phonemes. Corresponding frequency source input data 150a, which may include a frequency-based representation of the source input data 150, may be similarly processed by the speech encoder 154 and/or the phoneme characteristics encoder 156.

In various embodiments, the target input data 152 and the source input data 150 include representations of utterances by a same speaker. A first lost function 406 may compare a difference between the output data 162 output by the speech decoder 160 and target data 408 (e.g., the expected output of the speech decoder 160). Based on the difference therebetween, values of nodes of the speech decoder 160 (e.g., offset values and/or scale values) may be determined in accordance with an algorithm, such as a gradient descent algorithm, and the values may be back-propagated throughout the speech decoder 160 and the encoders 402, 156, 158. The first loss function 406 may be used to determine the difference between the output data 162 and the target data 408 again, and the values of the nodes may be again back-propagated. This process may be repeated until the output of the first loss function 406 is less than a threshold.

A second loss function 404 may be used to compare the output of the speech encoder 154 with the output of the phoneme encoder 402, and new values of the nodes of the speech encoder 154 may be computed and back-propagated, to minimize the value of the second loss function 404. When the value of the second loss function 404 is minimized, the phrase encoded data A 306a output by the speech encoder 154 may be approximately equal to the phrase encoded data B 306b output by the phoneme encoder 402. In other words, the second loss function 404 may be used to train the speech encoder 154 to produce the same or similar output as the phoneme encoder 402 despite the two encoders processing different data (e.g., the frequency source input data 150a processed by the speech encoder 154 and the phoneme source input data 150b processed by the phoneme encoder 402). As shown above with reference to FIG. 3, once the speech decoder 160 is trained to produce the same or similar output as the phoneme encoder 402, the phoneme encoder 402 may not be used to produce the phrase encoded data B 306b.

In various embodiments, the source input data 150 may include representations of both the utterance and of noise. The noise may be, for example, other utterances, environmental noise, reverberations, echoes, or any other noise. The noise may be added to the source input data 150; that is, first source input data 150 may include a representation of the utterance with no noise, and second source input data 150 may include a representation of the utterance with added noise. If the source input data 150 includes noise, however, the target data 408 may include a representation of the utterance without the noise. The speech decoder 160 may thus be trained to determine output data 162 that does not include a representation of the noise (e.g., only of the utterance) even if the source input data 150 includes representations of both the utterance and the noise.

FIG. 5 illustrates the voice-transfer component 204 with other components that may be used to further process audio data. A target frequency extraction component 506 may, for example, process target input audio data 502 to determine the target input audio data 152. The target input audio data 502 may be time-domain audio data, such as audio received from a microphone, and may include a time-domain representation of an utterance by a target speaker. The target frequency extraction component 506 may perform one or more operations, such as a Fourier transform or Mel transform, to determine the target input data 152, which may be one or more spectrograms of the target input audio data 502, such as Mel-spectrograms. Similarly, a source frequency extraction component 508 may process time-domain source input audio data 504 to determine frequency source input data 150*a*, which may similarly be one or more Mel-spectrograms of the source input audio data 504.

A source phoneme extraction component 510 may also process the source input audio data 504 to determine phone source input data 150*b*. The source phoneme extraction component 510 may be a neural-network model, such as an acoustic model, that processes the source input audio data 504 to determine one or more phonemes represented therein. The phone source input audio data 150*b* may thus represent a sequence of phonemes represented in the source input audio data 504.

A vocoder component 206 may process the output data 162, which may include spectrogram data such as Mel-spectrogram data, to determine output audio data 512, which may be time-domain audio data representing an utterance. The output audio data 512 may include a representation of the source input audio data 504 that omits vocal characteristics of the source input audio data 504 but includes vocal characteristics of the target input audio data 502. The vocoder component 206 may be and/or may include a neural network, such as a CNN, that processes the output data 162 in accordance with one or more nodes arranged in one or more layers. Each node may include a corresponding weights and/or offset that modifies its input accordingly. The weights and/or offsets may be determined by processing training data, determining updated weights via an evaluation function such as a loss function, and then back-propagating the updated weights.

Figure 6B:
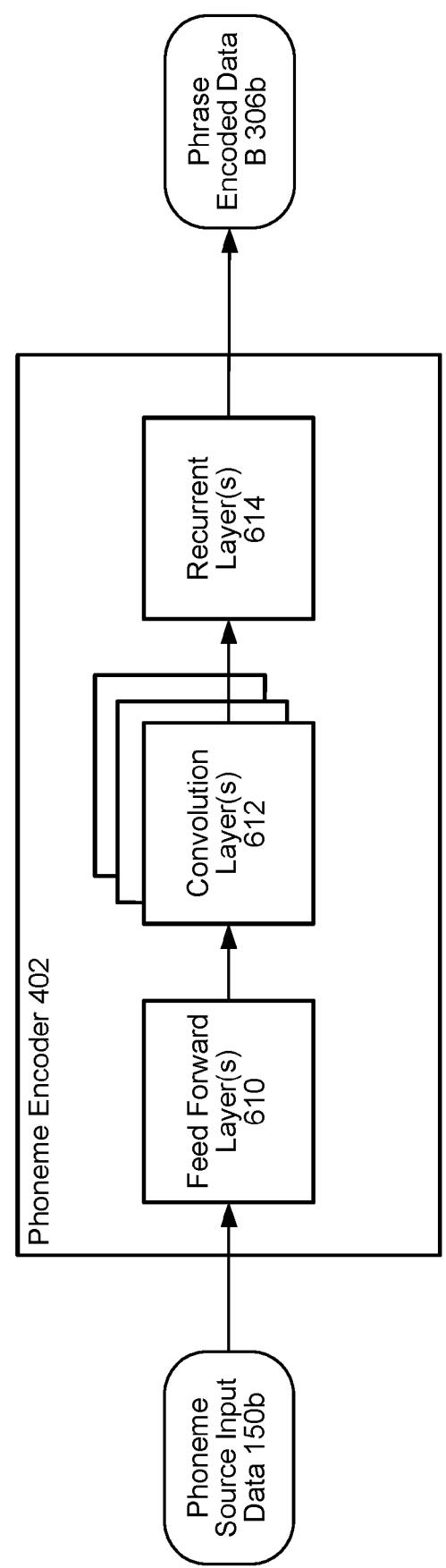

FIGS. 6A and 6B illustrate components of for processing audio data according to embodiments of the present disclosure. Referring first to FIG. 6A, the speech encoder 154 may include one or more neural-network layers, such as one or more CNN layers 602 and/or one or more recurrent layers 604, such as long short-term memory (LSTM) and/or gated recurrent unit (GRU) layers. Similarly, with reference to FIG. 6B, the phoneme encoder 402 may include one or more feed-forward layers 610, one or more CNN layers 612, and/or one or more recurrent layers 614. The present disclosure is not, however, limited to any particular type or arrangement of layers for either the speech encoder 154 and/or phoneme encoder 402, and any type of layers or arrangement thereof are within the its scope.

Figure 7:
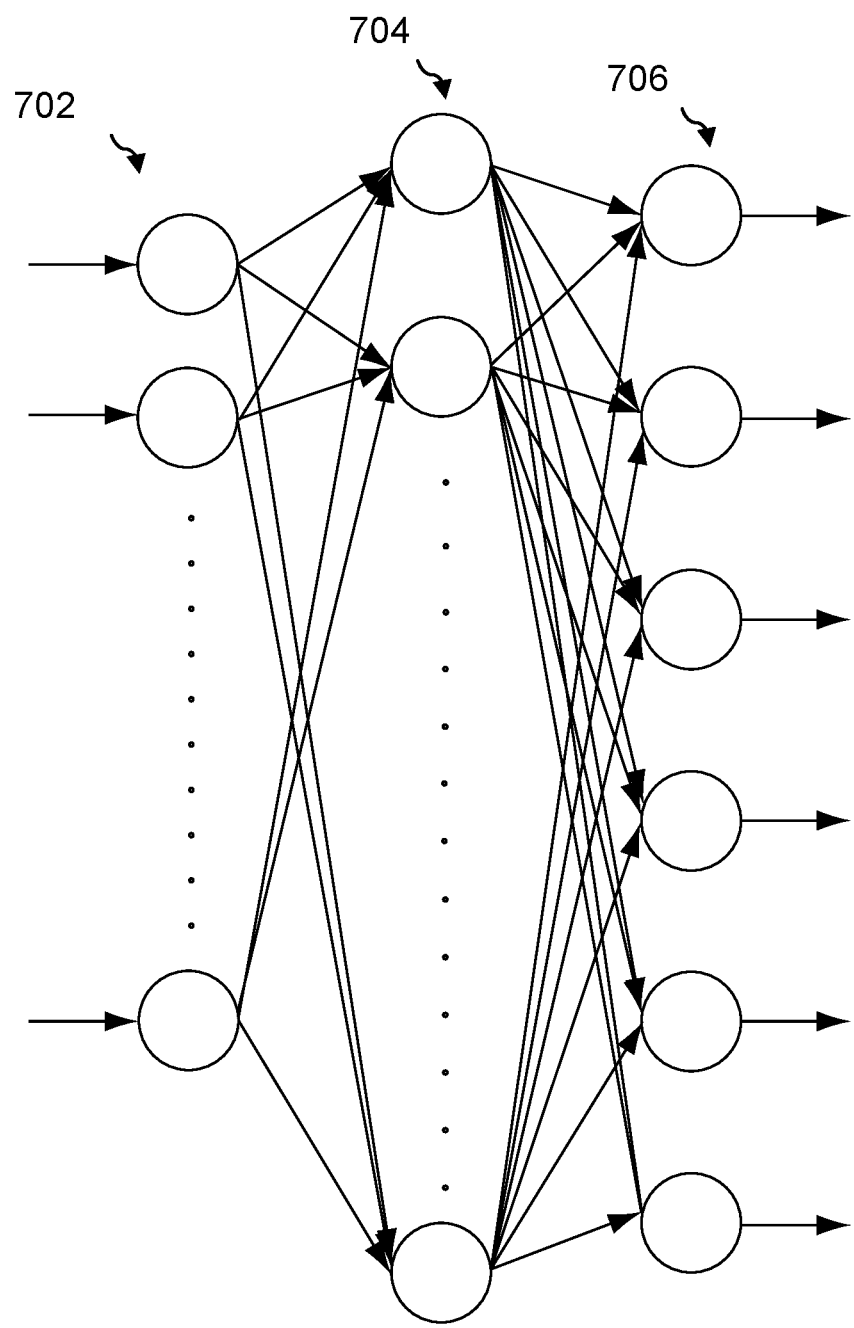
FIG. 7 illustrates a neural network for speech processing according to embodiments of the present disclosure.

An example neural network, which may be the speech encoder 154, phoneme characteristics encoder 156, vocal characteristics encoder 158, and/or speech decoder 160, is illustrated in FIG. 7. The neural network may include nodes organized as an input layer 702, one or more hidden layer(s) 704, and an output layer 706. The input layer 702 may include m nodes, the hidden layer(s) 704 n nodes, and the output layer 706 o nodes, where m, n, and o may be any numbers and may represent the same or different numbers of nodes for each layer. Nodes of the input layer 702 may receive inputs (e.g., the audio data 302), and nodes of the output layer 706 may produce outputs (e.g., the input spectrogram data 306). Each node of the hidden layer(s) 704 may be connected to one or more nodes in the input layer 702 and one or more nodes in the output layer 704. Although the neural network illustrated in FIG. 7 includes a single hidden layer 704, other neural networks may include multiple hidden layers 704; in these cases, each node in a hidden layer may connect to some or all nodes in neighboring hidden (or input/output) layers. Each connection from one node to another node in a neighboring layer may be associated with a weight and/or score. A neural network may output one or more outputs, a weighted set of possible outputs, or any combination thereof.

The neural network may also be constructed using recurrent connections such that one or more outputs of the hidden layer(s) 704 of the network feeds back into the hidden layer(s) 704 again as a next set of inputs. Each node of the input layer connects to each node of the hidden layer; each node of the hidden layer connects to each node of the output layer. As illustrated, one or more outputs of the hidden layer is fed back into the hidden layer for processing of the next set of inputs. A neural network incorporating recurrent connections may be referred to as a recurrent neural network (RNN).

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech recognition when the entire lattice is processed.

Figure 8:
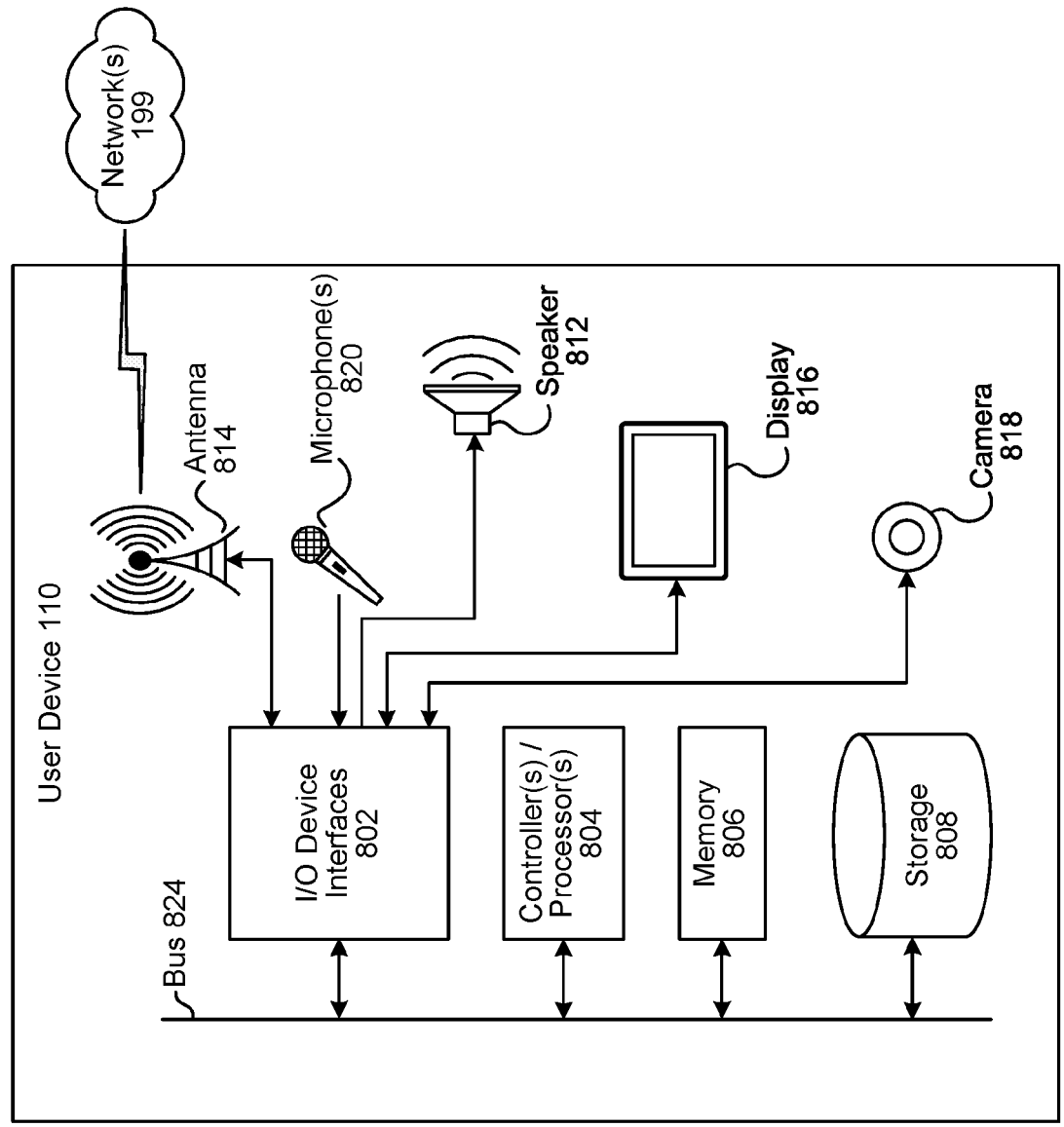
FIG. 8 illustrates components of a user device for speech processing according to embodiments of the present disclosure.
Figure 9:
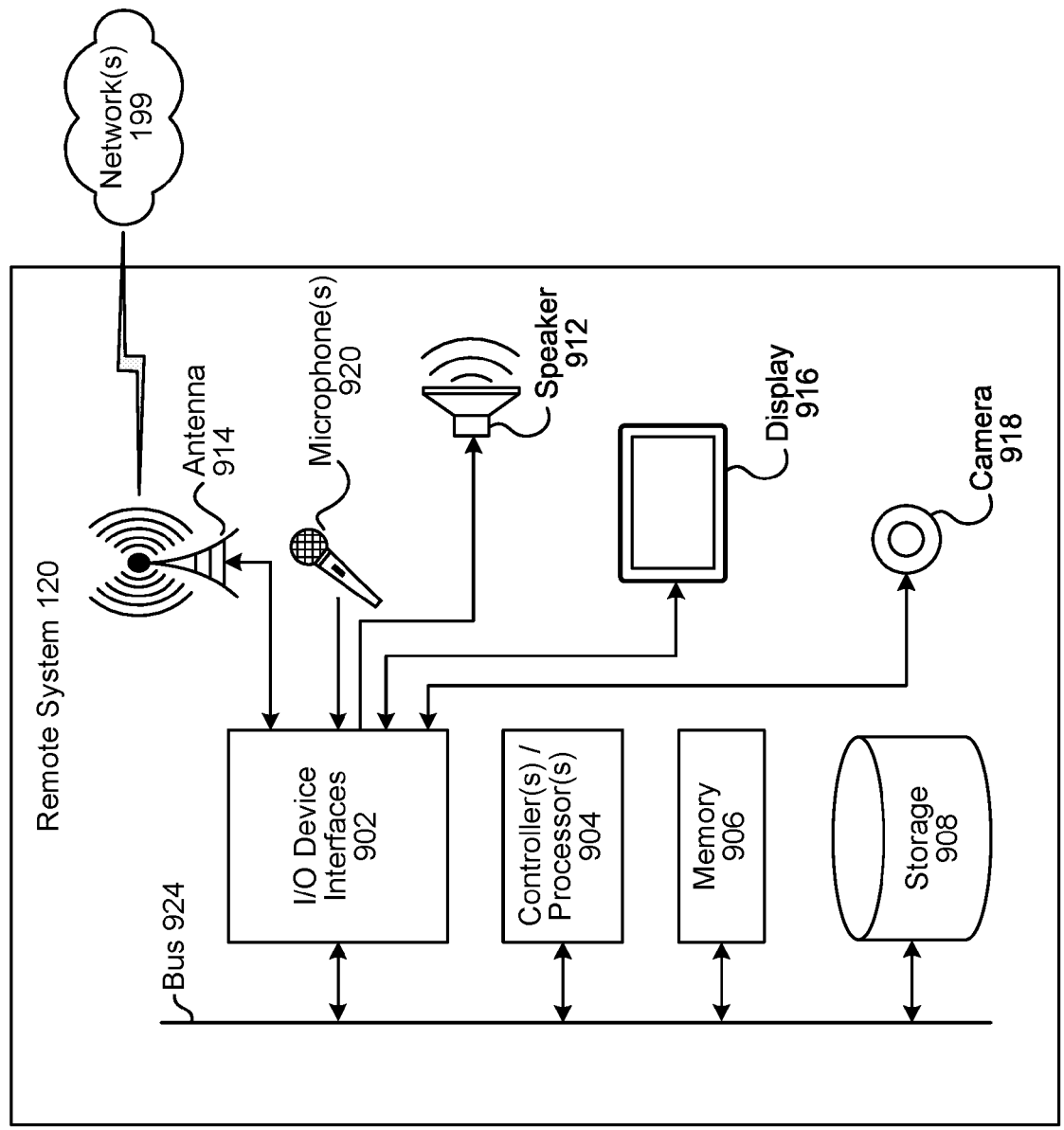
FIG. 9 illustrates components of a remote system for speech processing according to embodiments of the present disclosure.

FIG. 8 is a block diagram conceptually illustrating a user device 110. FIG. 9 is a block diagram conceptually illustrating example components of the remote system 120, which may be one or more servers and which may assist with voice-transfer processing, TTS processing, NLU processing, etc. The term "system" as used herein may refer to a traditional system as understood in a system / client computing structure but may also refer to a number of different computing components that may assist with the operations discussed herein. For example, a server may include one or more physical computing components (such as a rack system) that are connected to other devices / components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902). The device 110 may further include loudspeaker(s) 812, microphone(s) 820, display(s) 816, and/or camera(s) 818. The remote system 120 may similarly include antenna(s) 914, loudspeaker(s) 912, microphone(s) 920, display(s) 916, and/or camera(s) 918.

Computer instructions for operating each device/system (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device/system (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Figure 10:
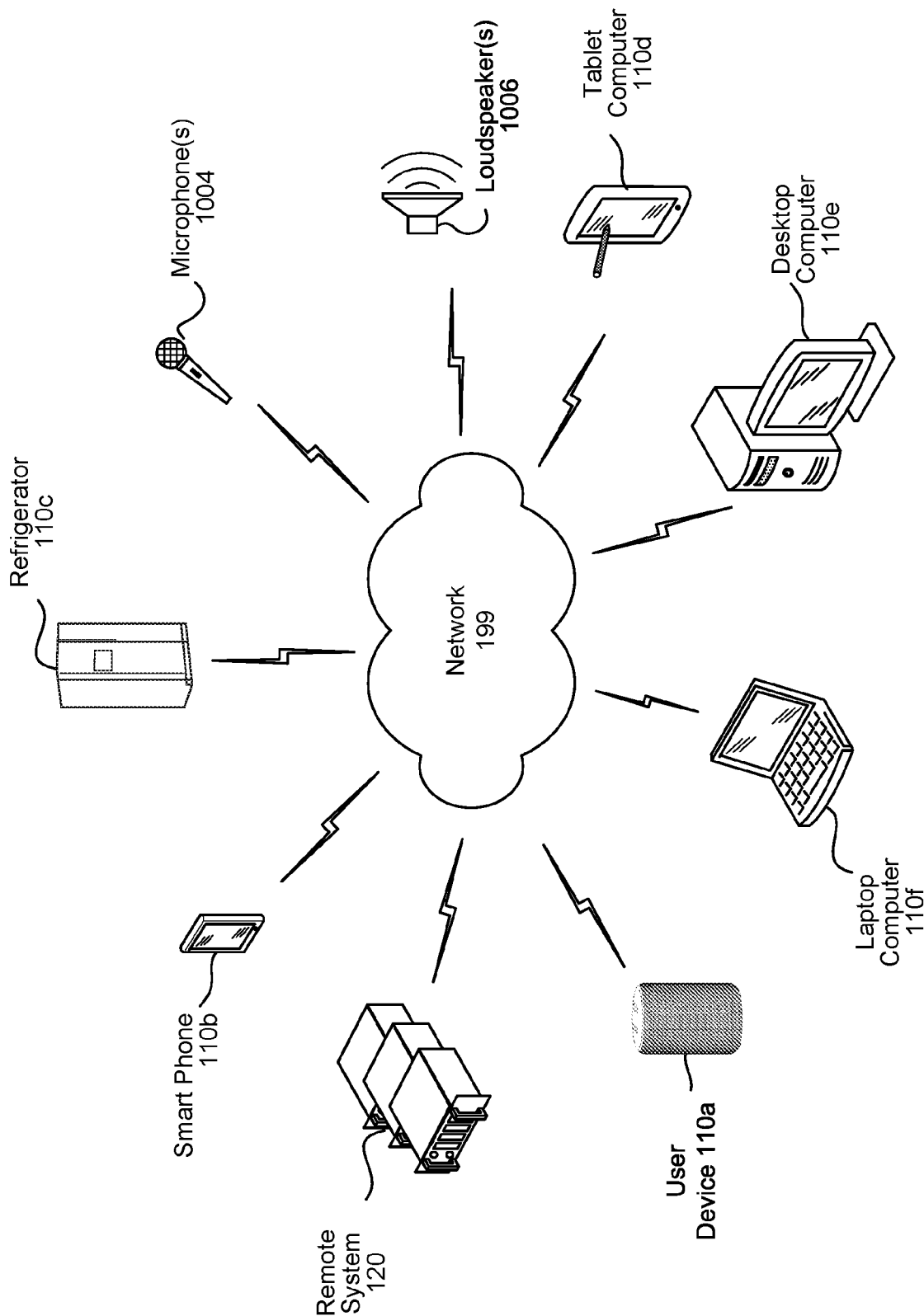
FIG. 10 illustrates a networked computing environment according to embodiments of the present disclosure.

Referring to FIG. 10, the device 110 may include input/output device interfaces 802 that connect to a variety of components such as an audio output component (e.g., a microphone 1004 and/or a loudspeaker 1006), a wired headset, and/or a wireless headset (not illustrated), or other component capable of outputting audio. The device 110 may also include an audio capture component. The audio capture component may be, for example, the microphone 820 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical systems in a collection of systems or other components.

The components of the device(s) 110 and/or the system 120 may include their own dedicated processors, memory, and/or storage. Alternatively, one or more of the components of the device(s) 110 and/or the system 120 may utilize the I/O interfaces (802/902), processor(s) (804/904), memory (806/906), and/or storage (808/908) of the device(s) 110 and/or system 120.

As noted above, multiple devices may be employed in a single system. In such a multi-device system, each of the devices may include different components for performing different aspects of the system's processing. The multiple devices may include overlapping components. The components of the device 110 and/or the system 120, as described herein, are illustrative, and may be located as a stand-alone device or may be included, in whole or in part, as a component of a larger device or system.

The network 199 may further connect a user device 110a, a tablet computer 110d, a smart phone 110b, a refrigerator 110c, a desktop computer 110e, and/or a laptop computer 110f through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones and/or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating speech, the method comprising:
   receiving, from at least one microphone of a user device, first audio data representing first speech corresponding to a first voice;
   processing the first audio data to determine first Mel-spectrogram data representing the first speech;
   receiving second audio data corresponding to a second voice;
   processing the second audio data to determine second Mel-spectrogram data representing the second voice;
   processing, using a first encoder, the first Mel-spectrogram data to determine first encoded data corresponding to phoneme characteristics of the first speech;
   processing, using a second encoder, the first Mel-spectrogram data to determine second encoded data corresponding to a phrase of the first speech;
   processing, using a third encoder, the second Mel-spectrogram data to determine third encoded data corresponding to vocal characteristics of the second voice;
   processing, using a decoder, the first encoded data, the second encoded data, and the third encoded data to determine third Mel-spectrogram data corresponding to the phoneme characteristics, the vocal characteristics, and the phrase; and
   processing, using a vocoder, the third Mel-spectrogram data to determine output audio data corresponding to the vocal characteristics of the second voice.

2. The computer-implemented method of claim 1, wherein the decoder is a trained neural network, further comprising:
   receiving text data;
   processing, using a fourth encoder, the text data to determine fourth encoded data corresponding to a second phrase;
   processing, using the decoder, the first encoded data, the third encoded data, and the fourth encoded data to determine fourth Mel-spectrogram data corresponding to the phoneme characteristics, the vocal characteristics, and the second phrase; and
   processing, using the vocoder, the fourth Mel-spectrogram data to determine second output audio data corresponding to the vocal characteristics of the second voice.

3. A computer-implemented method comprising:
   receiving, from at least one microphone of a user device, first audio data representing first noise and first speech corresponding to a first voice, the first speech including a first plurality of words;
   receiving second audio data corresponding to a second voice different from the first voice;
   processing, using a first encoder, the first audio data to determine first encoded data corresponding to phoneme characteristics of the first speech;
   processing, using a second encoder, the first audio data to determine second encoded data corresponding to the first noise and to a phrase of the first speech;
   processing, using a third encoder, the second audio data to determine third encoded data corresponding to vocal characteristics of the second voice; and
   processing, using a decoder, the first encoded data, the second encoded data, and the third encoded data to determine third audio data representing second speech corresponding to the second voice, the second speech including the first plurality of words.

4. The computer-implemented method of claim 3, further comprising:
   receiving fourth audio data representing third speech corresponding to the first voice;
   processing, using the first encoder, the fourth audio data to determine fourth encoded data corresponding to second phoneme characteristics of the third speech;
   processing, using the second encoder, the fourth audio data to determine fifth encoded data corresponding to a second phrase of the third speech; and
   processing, using the decoder, the fourth encoded data and the fifth encoded data to determine fifth audio data corresponding to the second phoneme characteristics, the vocal characteristics, and the second phrase.

5. The computer-implemented method of claim 3, further comprising:
   processing the third audio data using a vocoder to determine output audio data, wherein the third audio data corresponds to the phoneme characteristics, the vocal characteristics, and the phrase; and
   causing output of the output audio data.

6. The computer-implemented method of claim 3, further comprising:
   processing, using an automatic speech recognition component, the first audio data to determine text data representing the first speech;
   sending, to a remote system, the text data and output audio data corresponding to the third audio data;
   causing the remote system to output the text data and the output audio data; and
   receiving, from the remote system, an indication that the text data corresponds to the first speech.

7. The computer-implemented method of claim 3, further comprising:
   determining that a user profile includes an indication of sending the third audio data;
   sending, from the user device to a remote system, output data corresponding to the third audio data; and
   deleting, by the user device the first audio data.

8. The computer-implemented method of claim 3, further comprising:
   determining fourth audio data representing an utterance;
   determining fifth audio data representing second noise;
   determining, using the fourth audio data and the fifth audio data, sixth audio data representing the utterance and the second noise;
   processing, using the first encoder, the second encoder, and the decoder, the sixth audio data to determine seventh audio data; and
   determining a difference between the seventh audio data and the fourth audio data.

9. The computer-implemented method of claim 3, further comprising:
   determining text data corresponding to the first speech;
   processing, using a fourth encoder, the text data to determine fourth encoded data corresponding to the phrase; and
   determining a difference between the second encoded data and the fourth encoded data.

10. The computer-implemented method of claim 3, further comprising:
    determining that the first audio data includes a representation of a wakeword;

determining text data corresponding to the first speech;

sending, to a remote system, the third audio data and the text data; and receiving, from the remote system, an indication that the third audio data corresponds to the text data.

11. The computer-implemented method of claim 3, further comprising:

receiving, from the at least one microphone of the user device, fourth audio data; and processing the fourth audio data to determine the first audio data, wherein the first audio data comprises a representation of a Mel-spectrogram.

12. A system comprising:

at least one processor; and at least one memory including instructions that, when executed by the at least one processor, cause the system to:

receive, from at least one microphone of a user device, first audio data representing first noise and first speech corresponding to a first voice, the first speech including a first plurality of words;

receive second audio data corresponding to a second voice different from the first voice;

process, using a first encoder, the first audio data to determine first encoded data corresponding to phoneme characteristics of the first speech;

process, using a second encoder, the first audio data to determine second encoded data corresponding to the first noise and to a phrase of the first speech;

process, using a third encoder, the second audio data to determine third encoded data corresponding to vocal characteristics of the second voice; and process, using a decoder, the first encoded data, the second encoded data, and the third encoded data to determine third audio data representing second speech corresponding to the second voice, the second speech including the first plurality of words.

13. The system of claim 12, wherein the at least one memory further includes instructions that, when executed by the at least one processor, further cause the system to:

receive fourth audio data representing third speech corresponding to the first voice;

process, using the first encoder, the fourth audio data to determine fourth encoded data corresponding to second phoneme characteristics of the third speech;

process, using the second encoder, the fourth audio data to determine fifth encoded data corresponding to a second phrase of the third speech; and process, using the decoder, the fourth encoded data and the fifth encoded data to determine fifth audio data corresponding to the second phoneme characteristics, the vocal characteristics, and the second phrase.

14. The system of claim 12, wherein the at least one memory further includes instructions that, when executed by the at least one processor, further cause the system to:

process the third audio data using a vocoder to determine output audio data, the third audio data corresponding to the phoneme characteristics, the vocal characteristics, and the phrase; and cause output of the output audio data.

15. The system of claim 12, wherein the at least one memory further includes instructions that, when executed by the at least one processor, further cause the system to:

process, using an automatic speech recognition component, the first audio data to determine text data representing the first speech;

send, to a remote system, the text data and output audio data corresponding to the third audio data;

cause the remote system to output the text data and the output audio data; and receive, from the remote system, an indication that the text data corresponds to the first speech.

16. The system of claim 12, wherein the at least one memory further includes instructions that, when executed by the at least one processor, further cause the system to:

determine that a user profile includes an indication of sending the third audio data;

send, from the user device to a remote system, output data corresponding to the third audio data; and delete, by the user device the first audio data.

17. The system of claim 12, wherein the at least one memory further includes instructions that, when executed by the at least one processor, further cause the system to:

determine fourth audio data representing an utterance;

determine fifth audio data representing second noise;

determine, using the fourth audio data and the fifth audio data, sixth audio data representing the utterance and the second noise;

process, using the first encoder, the second encoder, and the decoder, the sixth audio data to determine seventh audio data; and determine a difference between the seventh audio data and the fourth audio data.

18. The system of claim 12, wherein the at least one memory further includes instructions that, when executed by the at least one processor, further cause the system to:

determine text data corresponding to the first speech;

process, using a fourth encoder, the text data to determine fourth encoded data corresponding to the phrase; and determine a difference between the second encoded data and the fourth encoded data.

19. The system of claim 12, wherein the at least one memory further includes instructions that, when executed by the at least one processor, further cause the system to:

determine that the first audio data includes a representation of a wakeword;

determine text data corresponding to the first speech;

send, to a remote system, the third audio data and the text data; and receive, from the remote system, an indication that the third audio data corresponds to the text data.

20. The system of claim 12, wherein the at least one memory further includes instructions that, when executed by the at least one processor, further cause the system to:

receive, from the at least one microphone of the user device, fourth audio data; and process the fourth audio data to determine the first audio data, wherein the first audio data comprises a representation of a Mel-spectrogram.

\* \* \* \* \*